Nov. 14, 1967  P. N. NELSON  3,352,571
FIFTH WHEEL CONNECTOR
Filed Oct. 15, 1965
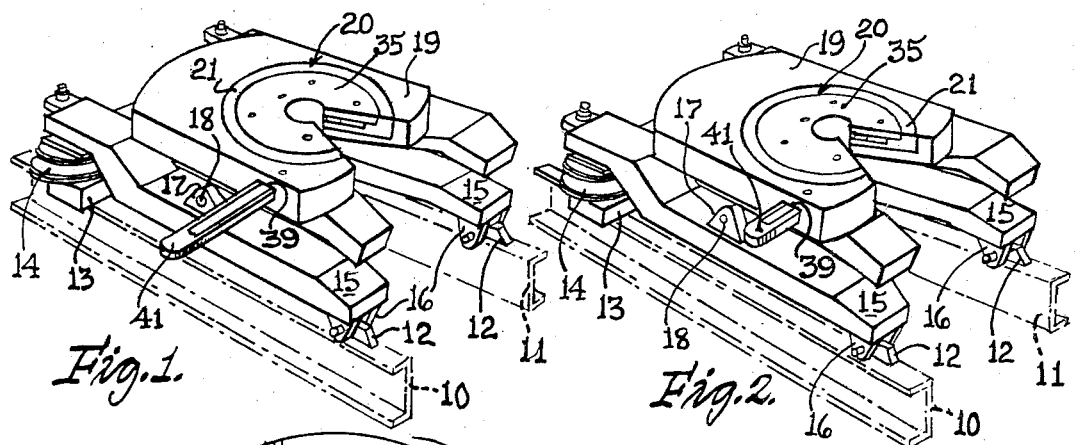
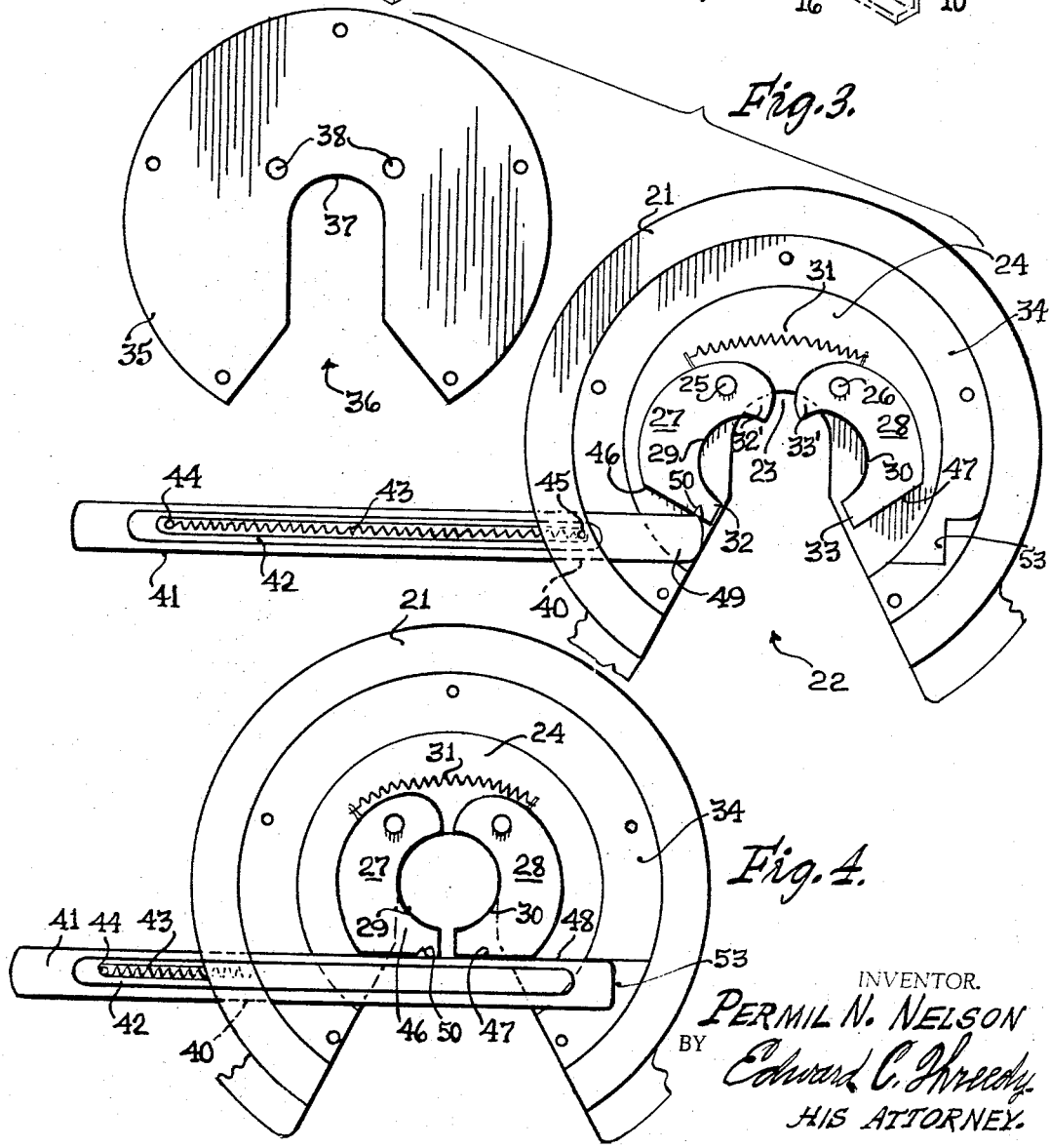
INVENTOR.
PERMIL N. NELSON
BY Edward C. Threedy
HIS ATTORNEY.

United States Patent Office

3,352,571
Patented Nov. 14, 1967

3,352,571
FIFTH WHEEL CONNECTOR
Permil N. Nelson, P.O. Box 505, Galesburg, Ill. 61401
Filed Oct. 15, 1965, Ser. No. 496,601
4 Claims. (Cl. 280—435)

ABSTRACT OF THE DISCLOSURE

A connecting mechanism between a tractor and a semi-trailer having a pair of movable jaw members for embracing a connecting stud post carried by the semi-trailer to connect the same to the tractor. The jaws provide flat wall surfaces which are pivoted into longitudinal alignment when the jaw members are pivoted into a locking position and which flat wall surfaces are engaged by a movable latch bar which prevents the jaw members to pivot into an open position releasing the connection between the tractor and semi-trailer.

---

This invention relates to a new and useful improvement in a fifth wheel connector and more particularly to a positive and visual lock for the connecting mechanism between a tractor and a semi-trailer.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a fragmentary perspective view of one part of the fifth wheel connector in its unlatched position;

FIG. 2 is a fragmentary perspective view of one part of the fifth wheel connector in a latched or locked position.

FIG. 3 is a plan view of a section of one part of the fifth wheel connector with the cover plate removed;

FIG. 4 is a plan view of a portion of one part of the fifth wheel connector in a latched position.

This invention relates to a locking mechanism as applied to a fifth wheel connection between a tractor and a semi-trailer. While the drawings and specification will identify a lower fifth wheel plate as being carried by a portion of the tractor and will show an upper fifth wheel connection plate adapted to be carried by a semi-trailer, it is understood that these parts could be reversed without departing from the teachings of this invention.

Referring to FIG. 1 there is shown a fragmentary tractor frame comprising a pair of parallel frame members 10 and 11 having mounting brackets 12 connected thereon adjacent the rear end thereof. The frame members 10 and 11 adjacent their opposite ends carry a cross support member 13 which in turn has positioned thereon a cushioning member 14 for supporting one end of a pair of supporting legs 15.

As shown in FIG. 1, there is a supporting leg 15 positioned above each of the frame members 10 and 11 and they have their free ends connected by brackets and pins 16 to the mounting brackets 12 hereinbefore identified.

Each of the supporting legs 15 carries intermediate their ends a vertically extending bracket 17 which in turn has journalled therein a supporting shaft 18 upon which is mounted a hitch plate 19. The hitch plate 19 in turn carries the lower fifth wheel connecting mechanism 20.

The lower fifth wheel connecting mechanism 20 includes a circular base plate 21, positioned within a relieved portion of the hitch plate 19. This base plate 21 has formed therein a slot 22 which terminates into a semi-circular opening 23 centrally located with respect to the plate 21. The opposite edge portions of the slot 22 diverge outwardly so as to provide an enlarged entranceway similar in design to that formed in the hitch plate 19. The base 21 is provided with a recessed area 24 extending circularly about the opening 23. Within the recess 24 there are provided two spaced apart pivot pins 25 and 26 having journalled thereon locking jaw members 27 and 28 respectively. One side edge of each of the jaw members 27 and 28 is provided with a semi-circular cut-out 29 and 30 respectively having a diameter equal to that of the semi-circular opening 23 formed in the base plate 21.

Connected to each of the jaw members 27 and 28 in the manner shown in FIG. 3, is a spring member 31 which normally tends to pivot the jaw members 27 and 28 in the position shown in FIG. 3. In such position, the jaw members 27 and 28 are in their inoperative or unlatched position, and in such position have their semi-circular edge cut-out portions 29 and 30 disposed horizontally out of vertical alignment with the opening 23. In the unlatched position of the jaw members 27 and 28, the free end portions thereof, and the walls which define the cut-outs 29 and 30, provide latch legs 32 and 33. In the latched position of the jaw members 27 and 28 these latch legs 32 and 33 assume the position shown in FIG. 4 and project into the slot 22 in an abutting relation with the wall portions defining the cut-outs 29 and 30 of the jaw members 27 and 28 in alignment with the semi-circular opening 23.

The recess 24 is provided with a radially extending shoulder 34 which is adapted to receive a removable cover 35. This cover 35 is so formed as to provide an entranceway 36 and a semi-circular center opening 37 all of which are adapted to be placed in vertical alignment with the semi-circular opening 23 and slot 22 formed in the base plate 21.

The cover 35 is provided with apertures 38 adapted to receive the pivot pins 25 and 26 hereinbefore identified. This cover 35 is adapted to be connected by means of bolts or the like, to the circular base plate 21 to seal the parts contained therein.

One wall of the hitch plate 19 has formed therein an opening 39 which is in horizontal alignment with a like opening 40 formed in one wall of the circular base plate 21. Adapted to be slidably positioned in the openings 39 and 40 is a latch bar 41. This latch bar 41 is provided with an elongated center opening 42 into which is positioned an expandable spring 43. This spring 43 has one end 44 connected to the latch bar 41 and has its opposite end connected to a pin 45 which is journalled through the hitch plate 21. The latch bar 41 is adapted to be yieldably moved tangentially with respect to the circumference of the circular base plate 21.

As will be seen in FIGS. 3 and 4 each of the jaw members 27 and 28, adjacent the latch legs 32 and 33 respectively, provides flat wall surfaces 46 and 47. When the jaw members 27 and 28 are in their locking position, these flat surfaces 46 and 47 of each of the jaw members 27 and 28 are in facial abutment with one edge 48 of the latch bar 41. The latch bar 41 is projected into the position shown in FIG. 4 under the tension of the spring 43 when the latch jaws 27 and 28 have been caused to move into their locking position as hereinafter explained.

When it is desired to connect a semi-trailer to a tractor, the fifth wheel connecting mechanism is caused to be placed in the condition shown in FIGS. 1 and 3. In this position, the latch bar 41 is withdrawn out of the hitch plate 19 until the innermost corner 49 thereof engages a notch 50 formed in the flat wall 46 of the jaw member 27. The jaw members 27 and 28 pivot in opposite directions about their pivot pins 25 and 26 under the tension of their connecting spring 31. In this position the opposite ends 32' and 33' of the jaws 27 and 28 will project into the semi-circular opening 23 formed in the base plate 21.

As the tractor and semi-trailer are joined, the connecting stud post (not shown) of the upper fifth wheel connecting plate (not shown) is caused to move into the slot 22 of the circular base plate 21. As the stud post proceeds to be moved inwardly of the semi-circular opening 23, it will engage the jaw ends 32' and 33' forcing the jaw members 27 and 28 to pivot about their pivot pins 25 and 26 in the direction of each other and against the action of the spring 31. This initial movement of the jaw members 27 and 28 and particularly that of jaw members 27 will cause the disconnection between the corner 49 of the latch bar 41 and the notch 50 in the flat wall 46 of the jaw member 27, permitting the spring 43 to cause the latch bar 41 to automatically move inwardly of the circular base plate 21 until it moves into the locking position shown in FIG. 4 in which the jaw members 27 and 28 surround the stud post thus freely connecting the same to the circular base plate 21. The flat wall surfaces 46 and 47 of the jaw members 27 and 28 now engage the edge 48 of the bar 41 and are prevented from pivoting in opposite directions as long as the latch bar 41 is in latching position.

As is seen in FIG. 4, the shoulder 34 is relieved as at 53 so as to receive the end of the latch bar 41 when it is in latched position. This arrangement also reinforces the bar 41 in its latched position, and resists the pivotal pressure applied by the jaws 27 and 28.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A fifth wheel connector between a semi-trailer and tractor, including a hitch plate having a semi-circular opening formed centrally therethrough, and an entrance way having open communication therewith for receiving a connecting stud post carried by the trailer, and pivotal jaw members having inner portions extending into the opening and pivoted out of the opening by the connecting stud post, and outer free ends movable into the entrance way for locking the connecting stud post of the trailer in the opening, wherein the improvement comprises,
   (a) means connected to said jaw members yieldably holding the inner portions thereof in said opening and the outer free ends thereof out of said entrance way,
   (b) said jaw members adjacent their outer free ends providing flat outer wall surfaces extending at right angles to their confronting ends with said surfaces in longitudinal alignment when the outer free ends of said jaw members are pivoted into said entrance way by the connecting stud post of the trailer,
   (c) a latch bar movable tangentially with respect to said opening and through said entrance way into contact with said flat outer wall surfaces of said jaw members when jaw members are pivoted by the connecting stud post of the trailer for locking said jaw members against pivotal movement out of said entrance way, and
   (d) a notch formed in one of said outer free ends of one of said jaw members engaging one end of said latch bar and holding the same against movement through said entrance way when said outer free ends of said jaw members are pivoted by said spring member out of said entrance way.

2. A fifth wheel connector as defined by claim 1 and including a spring member having one end connected to said latch bar and its opposite end connected to the hitch plate for normally urging said latch bar into said entrance way.

3. A fifth wheel connector as defined by claim 1 wherein said means connected to said jaw members yieldably holding said inner portions thereof in said opening comprises a spring.

4. A fifth wheel connector as defined by claim 2 wherein said means connected to said jaw members yieldably holding said inner portions thereof in said opening comprises a spring having a compression tension greater than the compression tension of the spring member connected to said latch bar so that it yieldably holds said outer free ends of said jaw members out of said entrance way and said latch bar out of contact with said flat outer wall surfaces provided by said jaw members.

References Cited

UNITED STATES PATENTS

| | | | |
|---|---|---|---|
| 2,005,722 | 6/1935 | Ketel et al. | 280—435 |
| 2,726,879 | 12/1955 | Vaillant | 280—438 |
| 2,772,895 | 12/1956 | Steeves et al. | 280—432 |
| 2,788,989 | 4/1957 | Davies | 280—434 |
| 2,821,409 | 1/1958 | Chalmers | 280—440 |
| 2,833,561 | 5/1958 | Vaugoyeau | 280—438 |
| 2,838,326 | 6/1958 | Georgi | 280—434 |
| 3,251,610 | 5/1966 | Chosy | 280—435 |

LEO FRIAGLIA, *Primary Examiner.*